US012747327B2

(12) United States Patent
Mune et al.

(10) Patent No.: US 12,747,327 B2
(45) Date of Patent: Sep. 29, 2026

(54) POLYESTER FILM FOR WINDOW ATTACHMENT, AND POLYESTER FILM LAYERED BODY FOR WINDOW ATTACHMENT

(71) Applicant: Mitsubishi Chemical Corporation, Tokyo (JP)

(72) Inventors: Yasuhito Mune, Kusatsu (JP); Yuta Hattori, Nagahama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 264 days.

(21) Appl. No.: 17/655,077

(22) Filed: Mar. 16, 2022

(65) Prior Publication Data

US 2022/0204709 A1 Jun. 30, 2022

Related U.S. Application Data

(63) Continuation of application No. PCT/JP2020/034358, filed on Sep. 10, 2020.

(30) Foreign Application Priority Data

Sep. 20, 2019 (JP) ................................ 2019-172317

(51) Int. Cl.

| | |
|---|---|
| ***C08J 5/18*** | (2006.01) |
| ***C03C 17/32*** | (2006.01) |
| ***C08K 3/04*** | (2006.01) |
| ***C08K 5/18*** | (2006.01) |
| ***C08K 5/3417*** | (2006.01) |
| ***C09J 7/38*** | (2018.01) |
| ***C09J 7/40*** | (2018.01) |
| *C08K 3/36* | (2006.01) |

(52) U.S. Cl.

CPC ............... *C08J 5/18* (2013.01); *C03C 17/324* (2013.01); *C08K 3/04* (2013.01); *C08K 5/18* (2013.01); *C08K 5/3417* (2013.01); *C09J 7/38* (2018.01); *C09J 7/40* (2018.01); *C08J 2467/02* (2013.01); *C08K 3/36* (2013.01)

(58) Field of Classification Search

CPC ..... C08J 5/18; C08K 3/04; C08K 5/18; C08K 5/3417; C09J 7/38; C09J 7/40

USPC ........................................................ 428/216

See application file for complete search history.

(56) References Cited

U.S. PATENT DOCUMENTS

| | | | | |
|---|---|---|---|---|
| 2006/0210768 | A1* | 9/2006 | Masuda | B29C 33/68 428/141 |
| 2015/0251395 | A1* | 9/2015 | Haak | B32B 7/12 428/354 |

FOREIGN PATENT DOCUMENTS

| | | | | | |
|---|---|---|---|---|---|
| CN | 101817989 | B | | 4/2014 | |
| CN | 115678420 | A | * | 2/2023 | |
| JP | 2001-71437 | A | | 3/2001 | |
| JP | 2001071437 | A | * | 3/2001 | |
| JP | 2004149551 | A | * | 5/2004 | B32B 27/36 |
| JP | 2017-509517 | A | | 4/2017 | |
| TW | 201541111 | A | | 11/2015 | |

OTHER PUBLICATIONS

Machine_English_translation_JP_2004149551_A; Optical Easy Adhesion Film and Laminate; May 27, 2004; EPO; whole document (Year: 2024).*

Machine_English_translation_JP_2001071437_A; Biaxially Oriented Polyester Film Stuck to Window; Mar. 21, 2001; EPO; whole document (Year: 2024).*

International Search Report issued Nov. 10, 2020 in PCT/JP2020/034358, filed on Sep. 10, 2020, 2 pages.

Combined Taiwanese Office Action and Search Report issued Apr. 19, 2024, in corresponding Taiwanese Patent Application No. 109132143 (with English Translation of Category of Cited Documents), 6 pages.

* cited by examiner

*Primary Examiner* — Tahseen Khan

(74) *Attorney, Agent, or Firm* — Oblon, McClelland, Maier & Neustadt, L.L.P.

(57) ABSTRACT

The present invention relates to a polyester film for window attachment, including a polyester layer (A) containing a halogen-free blue dye and a pigment. According to the present invention, it is possible to provide a polyester film for window attachment which does not adversely affect the environment when discarded, and has excellent light resistance.

16 Claims, No Drawings

POLYESTER FILM FOR WINDOW ATTACHMENT, AND POLYESTER FILM LAYERED BODY FOR WINDOW ATTACHMENT

TECHNICAL FIELD

The present invention relates to a polyester film for window attachment which is used by being bonded to a window glass such as a window of an automobile or a window of a building, and a polyester film laminate for window attachment.

BACKGROUND ART

In general, a film is attached to a window of an automobile, a window of a building, or the like for the purpose of privacy protection, design, sunshine adjustment, glass scattering prevention, or the like. Examples of the material of such a film include polyester which is excellent in transparency, light resistance, water resistance, heat resistance, chemical resistance and mechanical strength, and is usually used as a colored film having a transparent feeling containing a coloring material.

As such a film, for example, PTL 1 proposes a window film having a transparent first outer layer containing polyethylene terephthalate (PET), a dyed core layer containing PET and one or more dyes selected from Pigment Yellow 147, Pigment Red 177, Pigment Blue 60, Pigment Black 31, Pigment Red 149, and Pigment Red 122, and a transparent second outer layer containing PET, and having excellent discoloration resistance (light resistance) of the coloring material by light irradiation.

CITATION LIST

Patent Literature

PTL 1: JP 2017-509517 T

SUMMARY OF INVENTION

Technical Problem

Incidentally, a blue coloring material may be used as the coloring material used in the above-mentioned applications, and a blue coloring material in which a halogen group is introduced into the structure may be used as the blue coloring material in order to improve light resistance or the like. Since a film using a coloring material into which a halogen group is introduced is not preferable from the viewpoint of environmental pollution (environmental load) at the time of discarding, in recent years, it is desired to use a halogen-free blue coloring material.

However, according to the studies of the present inventors, there is a problem that a halogen-free blue coloring material has poor weather resistance, and a colored film using the blue coloring material is discolored by light irradiation.

The present invention has been made in view of the above-described conventional problems, and an object of the present invention is to provide a polyester film for window attachment which does not adversely affect the environment when discarded and has excellent light resistance.

Solution to Problem

As a result of intensive studies, the present inventors have found that a combination of a halogen-free blue dye and a pigment can provide a polyester film having excellent light resistance without adversely affecting the environment when discarded, and have completed the present invention described below.

That is, the present invention relates to the following [1] to [14].

[1] A polyester film for window attachment, including a polyester layer (A) containing a halogen-free blue dye and a pigment.

[2] The polyester film for window attachment as set forth in [1], wherein the halogen-free blue dye is a halogen-free anthraquinone-based blue dye.

[3] The polyester film for window attachment as set forth in [2], wherein the halogen-free anthraquinone-based blue dye is a compound represented by the following general formula (I):

(I)

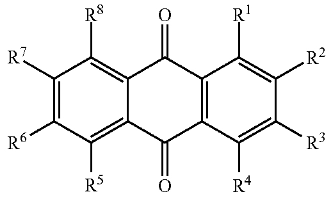

wherein $R^1$ and $R^4$ each independently represent a substituted or unsubstituted amino group, $R^2$, $R^3$, and $R^5$ to $R^8$ each independently represent a hydrogen atom or a substituent, and $R^2$ and $R^3$ may be bonded to each other to form a ring.

[4] The polyester film for window attachment as set forth in [3], wherein the halogen-free anthraquinone-based blue dye is a compound represented by the following general formula (III-a) or a compound represented by the following general formula (IV);

(III-a)

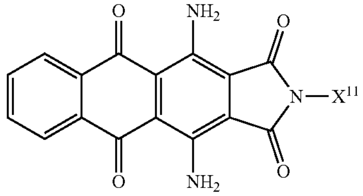

wherein $X^{11}$ represents a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group;

(IV)

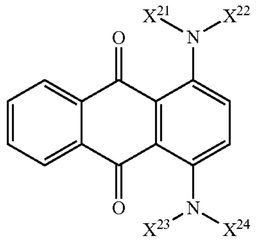

wherein $X^{21}$ to $X^{24}$ each independently represent a hydrogen atom, a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group.

[5] The polyester film for window attachment as set forth in any one of [1] to [4], including a polyester layer (B) on at least one surface of the polyester layer (A).

[6] The polyester film for window attachment as set forth in any one of [1] to [5], wherein a ratio of a thickness of the polyester layer (B) to a thickness of the polyester layer (A), [(B)/(A)], is 0.05 to 0.5.

[7] The polyester film for window attachment as set forth in any one of [1] to [6], wherein the pigment is carbon black.

[8] The polyester film for window attachment as set forth in [7], wherein a content of carbon black in the polyester layer (A) is 0.001 to 1.2% by mass.

[9] The polyester film for window attachment as set forth in any one of [1] to [6], wherein the pigment is silica and/or alumina.

[10] The polyester film for window attachment as set forth in [9], wherein a content (total value) of silica and/or alumina in the polyester layer (A) is 0.001 to 1.2% by mass.

[11] A polyester film laminate for window attachment, including: the polyester film for window attachment as set forth in any one of [1] to [10]; and a hard coat layer provided on a surface of the polyester film for window attachment.

[12] A polyester film laminate for window attachment, including: the polyester film for window attachment as set forth in any one of [1] to [10]; and a pressure-sensitive adhesive layer provided on a surface of the polyester film for window attachment.

[13] The polyester film laminate for window attachment as set forth in [11], including a pressure-sensitive adhesive layer on a surface of the polyester film for window attachment opposite to the hard coat layer.

[14] The polyester film laminate for window attachment as set forth in [12] or [13], further including a release film provided on a surface of the pressure-sensitive adhesive layer.

Advantageous Effects of Invention

According to the present invention, it is possible to provide a polyester film for window attachment which does not adversely affect the environment when discarded, and has excellent light resistance.

DESCRIPTION OF EMBODIMENTS

[Polyester Film for Window Attachment]

The polyester film for window attachment of the present invention has a polyester layer (A) containing a halogen-free blue dye and a pigment.

According to the present invention, since a halogen-free blue dye is used as a coloring material, it is possible to reduce an adverse effect on the environment when a polyester film for window attachment (hereinafter also simply referred to as "polyester film") is discarded. In addition, since the halogen-free blue dye and the pigment are used in combination, it is possible to improve the light resistance of the polyester film while suppressing the haze to be low.

Hereinafter, the configuration of the present invention will be described in detail.

<Polyester>

The polyester used as a raw material for the polyester film of the present invention is not particularly limited, but is preferably a polycondensation polymer of a dicarboxylic acid and a diol, and the dicarboxylic acid is preferably an aromatic dicarboxylic acid, and the diol is preferably an aliphatic diol.

Examples of the aromatic dicarboxylic acid include terephthalic acid, isophthalic acid, orthophthalic acid, biphenyldicarboxylic acid, diphenyl ether dicarboxylic acid, diphenyl sulfone-clicarboxylic acid, diphenyl ketone-dicarboxylic acid, 2,6-naphthalenedicarboxylic acid, 1,4-naphthalenedicarboxylic acid, and 2,7-naphthalenedicarboxylic acid. Among these, terephthalic acid, isophthalic acid, orthophthalic acid, naphthalene dicarboxylic acid, and 4,4'-biphenyl dicarboxylic acid are preferable, and terephthalic acid is more preferable.

Examples of the aliphatic diol include aliphatic cliols having a linear or branched structure, such as ethylene glycol, 2-butene-1,4-diol, trimethylene glycol, tetramethylene glycol, hexamethylene glycol, neopentyl glycol, methylpentanediol, and diethylene glycol; and alicyclic diols such as cyclohexanedimethanol, isosorbide, spiroglycol, 2,2,4,4-tetramethyl-1,3-cyclobutanediol, norbornenedimethanol, and tricyclodecanedimethanol. Among these, ethylene glycol, neopentyl glycol, and cyclohexane dimethanol are preferable, and ethylene glycol is more preferable.

As the polyester used in the present invention, it is preferable to use a polyester resin in which 50 mol % or more of a dicarboxylic acid unit is a constituent unit derived from terephthalic acid and 50 mol % or more of a diol unit is a constituent unit derived from ethylene glycol, that is, polyethylene terephthalate. In the case of polyethylene terephthalate, the polyester resin is less likely to become amorphous, and the transparency and light resistance become favorable.

When polyethylene terephthalate is used as the polyester resin, the polyester resin may be composed of polyethylene terephthalate alone, or may contain a polyester resin other than polyethylene terephthalate in addition to polyethylene terephthalate.

In the present invention, the amount of polyethylene terephthalate in the total amount of the polyester resin is preferably 80 to 100% by mass, and more preferably 90 to 100% by mass.

The polyethylene terephthalate used in the present invention preferably consists of constituent units derived from terephthalic acid and ethylene glycol, but may contain a constituent units derived from a bifunctional compound other than terephthalic acid and ethylene glycol.

Examples of the bifunctional compound include the aromatic dicarboxylic acids and aliphatic diols other than terephthalic acid and ethylene glycol, and bifunctional compounds other than aromatic dicarboxylic acids and aliphatic Examples of the bifunctional compound include linear or branched aliphatic bifunctional compounds, and specific examples thereof include aliphatic dicarboxylic acids such as malonic acid, succinic acid, adipic acid, azelaic acid, and sebacic acid; and aliphatic hydroxycarboxylic acids such as 10 -hydroxyoctadecanoyl acid, lactic acid, hydroxyacrylic acid, 2-hydroxy-2-methylpropionic acid, and hydroxybutyl acid.

Other examples include alicyclic bifunctional compounds such as alicyclic dicarboxylic acids such as cyclohexanedicarboxylic acid, norbornenedicarboxylic acid, and tricyclodecanedicarboxylic acid; and alicyclic hydroxycarboxylic acids such as hydroxymethylcyclohexanecarboxylic acid, hydroxymethylnorbornenecarboxylic acid, and hydroxymethyltricyclodecanecarboxylic acid.

Further examples include aromatic hydroxycarboxylic acids such as hydroxybenzoic acid, hydroxytoluic acid, hydroxynaphthoic acid, 3-(hydroxyphenyl)propionic acid, hydroxyphenylacetic acid, and 3-hydroxy-3-phenylpropionic acid; and aromatic diols such as bisphenol compounds and hydroquinone compounds.

The constituent unit derived from the bifunctional compound is preferably 20 mol % or less and more preferably 10 mol % or less with respect to the total moles of all the constituent units constituting the polyester resin.

When the polyethylene terephthalate used in the present invention contains a constituent unit derived from an aromatic dicarboxylic acid other than terephthalic acid, the aromatic dicarboxylic acid is preferably one or two or more selected from isophthalic acid, orthophthalic acid, naphthalenedicarboxylic acid, and 4,4'-biphenyldicarboxylic acid. These are low in cost, and a copolymerized polyester resin containing one of these is easy to produce.

When the polyethylene terephthalate contains a constituent unit derived from these aromatic dicarboxylic acids, the proportion of the constituent unit derived from the aromatic dicarboxylic acid is preferably 1 to 20 mol %, and more preferably 1 to 10 mol %, based on the dicarboxylic acid unit.

The intrinsic viscosity of the polyester resins used in the present invention is not particularly limited, but is preferably 0.45 to 1.0 dL/g, and more preferably 0.5 to 0.9 dL/g, from the viewpoint of film forming property, productivity, and the like.

The amount of the polyester in the polyester film of the present invention is preferably 90% by mass or more, and more preferably 95% by mass or more. When the amount of the polyester is equal to or greater than the lower limit value, the transparency of the polyester film can be secured.

<Halogen-Free Blue Dye>

The polyester film of the present invention contains a halogen-free blue dye in the polyester layer (A). In the present invention, since a halogen-free dye is used, an adverse effect on the environment can be reduced when the polyester film is discarded. In addition, in the present invention, since the halogen-free blue dye and a pigment which will be described below are used in combination, excellent light resistance of the polyester layer (A) can be obtained while suppressing haze of the polyester film.

The reason why light resistance is improved by using a halogen-free blue dye and a pigment in combination is not clear, but it is presumed that the light resistance is effectively developed because the halogen-free blue dye and the pigment are very well blended with each other and the halogen-free blue dye and the pigment are close to each other in the polyester layer (A), whereby the light irradiation amount to the halogen-free blue dye can be suppressed while suppressing the haze of the polyester film, even though the concentration of the pigment is low.

The halogen-free blue dye used in the present invention is preferable from the viewpoint of transparency of the polyester film.

Examples of the halogen-free blue dye include anthraquinone-based blue dyes, azo-based blue dyes, and phthalocyanine-based blue dyes. From the viewpoint of dyeability and fastness, a halogen-free anthraquinone-based blue dye is preferable.

The halogen-free anthraquinone-based blue dye used in the present invention is not particularly limited, and examples thereof include compounds represented by the following general formula (I).

(I)

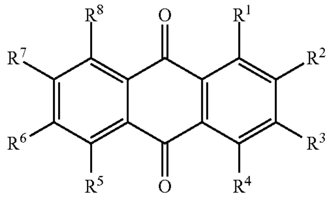

In the formula, $R^1$ to $R^8$ are each independently a hydrogen atom or a substituent, and $R^2$ and $R^3$ may be bonded to each other to form a ring.

Specifically, in the formula, $R^1$ to $R^8$ each independently represent a hydrogen atom, a nitro group, a hydroxy group, a mercapto group, a carboxy group, a cyano group, a thiocyano group, a substituted or unsubstituted alkyl group, a substituted or unsubstituted cycloalkyl group, a substituted or unsubstituted alkenyl group, a substituted or unsubstituted aryl group, a substituted or unsubstituted heterocyclic group, a substituted or unsubstituted amino group, a substituted or unsubstituted alkoxy group, a substituted or unsubstituted cycloalkyloxy group, a substituted or unsubstituted alkenyloxy group, a substituted or unsubstituted aryloxy group, a substituted or unsubstituted heterocyclic oxy group, a substituted or unsubstituted acyloxy group, a substituted or unsubstituted alkylsulfonyloxy group, a substituted or unsubstituted arylsulfonyloxy group, a substituted or unsubstituted alkoxycarbonyloxy group, a substituted or unsubstituted aryloxycarbonyloxy group, a substituted or unsubstituted alkoxycarbonyl group, a substituted or unsubstituted cycloalkyloxycarbonyl group, a substituted or unsubstituted alkenyloxycarbonyl group, a substituted or unsubstituted aryloxycarbonyl group, a substituted or unsubstituted heterocyclic oxycarbonyl group, a substituted or unsubstituted carbamoyl group, a substituted or unsubstituted sulfamoyl group, a substituted or unsubstituted acyl group, a substituted or unsubstituted alkylsulfonyl group, a substituted or unsubstituted arylsulfonyl group, a substituted or unsubstituted alkylthio group, a substituted or unsubstituted cycloalkylthio group, a substituted or unsubstituted arylthio group, a substituted or unsubstituted heterocyclic thio group, a substituted or unsubstituted alkoxysulfonyl group, a substituted or unsubstituted cycloalkyloxysulfonyl group, a substituted or unsubstituted alkenyloxysulfonyl group, a substituted or unsubstituted aryloxysulfonyl group, or a substituted or unsubstituted heterocyclic oxysulfonyl group. $R^2$ and $R^3$ may be bonded to each other to form a ring.

Examples of the substituted or unsubstituted alkyl groups of $R^1$ to $R^8$ include linear or branched alkyl groups having 1 to 20 carbon atoms, and specifically include a methyl group, an ethyl group, an iso-propyl group, an n-propyl group, an iso-butyl group, an n-butyl group, a pentyl group, a hexyl group, a 2-ethylhexyl group, an n-octyl group, an n-decyl group, and an n-dodecyl group.

Examples of the substituted alkyl group include a hydroxy group-substituted alkyl group such as 2-hydroxyethyl group and 3-hydroxyethyl group; a carboxy group-substituted alkyl group such as carboxymethyl group and 2-carboxyethyl group; a cyano group-substituted alkyl group such as 2-cyanoethyl group; a substituted or unsubstituted amino group-substituted alkyl group such as 2-aminoethyl group, 2-(N-methylamino)ethyl group, and 2-(N,N-dimethylamino)ethyl group; a substituted or unsubstituted carbamoyl group-substituted alkyl group such as carbamoylmethyl group and N,N-dimethylcarbamoylethyl group; a substituted or unsubstituted aryl group-substituted alkyl group such as 2-phenylethyl group and 2-(p-methylphenyl)ethyl group; a substituted or unsubstituted alkoxy group-substituted alkyl group such as 2-methoxyethyl group and 3-methoxypropyl group; a substituted or unsubstituted aryloxy group-substituted alkyl group such as 2-phenoxyethyl group and 2-(p-methylphenoxy)ethyl group; a substituted or unsubstituted acyloxy group-substituted alkyl group such as 2-acetoxyethyl group; a cycloalkyloxy group-substituted alkyl group such as cyclohexyloxymethyl group; an alkylthio group-substituted alkyl group such as 2-methylthioethyl group and 3-ethylthiopropyl group; a substituted or unsubstituted arylthio group-substituted alkyl group such as phenylthiomethyl group and 2-(p-methylphenylthio)ethyl group; a cycloalkylthio group-substituted alkyl group such as cyclohexylthiomethyl group; a heterocyclic thio group-substituted alkyl group such as 2-(2-mercaptobenzothiazolyl)ethyl group; a substituted or unsubstituted alkoxycarbonyl group-substituted alkyl group such as methoxycarbonylmethyl group, 2-ethoxycarbonylethyl group, and 2-(2-methoxyethoxy)carbonylethyl group; a substituted or unsubstituted aryloxycarbonyl group-substituted alkyl group such as 2-phenoxycarbonylethyl group and 2-(p-methoxyphenoxy)carbonylethyl group; a cycloalkyloxycarbonyl group-substituted alkyl group such as 2-cyclohexyloxycarbonylethyl group; a carboxy group-substituted alkyl group such as 2-carboxyethyl group; and a mercapto group-substituted alkyl group such as 2-mercaptoethyl group.

Examples of the substituted or unsubstituted cycloalkyl group of $R^1$ to $R^8$ include those having 4 to 7 carbon atoms, such as a cyclopentyl group, a cyclohexyl group, and a cycloheptyl group.

Examples of the substituted or unsubstituted alkenyl group of $R^1$ to $R^8$ include linear or branched alkenyl groups having 2 to 10 carbon atoms, such as a vinyl group, an allyl group, a propenyl group, a butenyl group, and a pentenyl group.

Examples of the substituted or unsubstituted aryl group of $R^1$ to $R^8$ include a phenyl group and a naphthyl group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituted or unsubstituted heterocyclic group of $R^1$ to $R^8$ include a pyridyl group, a quinolyl group, a furyl group, a pyranyl group, a pyrrolyl group, an imidazolyl group, an oxazolyl group, a pyrazolyl group, a thienyl group, a thiazolyl group, an isothiazolyl group, an isoxazolyl group, a pyrimidyl group, a triazinyl group, a benzothiazolyl group, and a benzoxazolyl group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituents of the substituted amino group of $R^1$ to $R^8$ include a substituted or unsubstituted alkyl group having 1 to 20 carbon atoms, such as a methyl group, an ethyl group, a propyl group, a butyl group, an octyl group, a 2-ethylhexyl group, a dodecyl group, a 2-hydroxyethyl group, a 2-methoxyethyl group, a 2-(2-methoxyethoxy)ethyl group, a benzyl group, a 2-phenethyl group, and a tetrahydrofurfuryl group; an alkenyl group having 2 to 20 carbon atoms, such as a vinyl group, an allyl group, a propenyl group, a butenyl group, and a pentenyl group; a cycloalkyl group such as a cyclopentyl group and a cyclohexyl group; a substituted or unsubstituted aryl group which has, as a substituent, a linear or branched alkyl group having 1 to 10 carbon atoms, a linear or branched alkoxy group having 1 to 10 carbon atoms, and a substituted alkyl group such as a hydroxyethyl group and a methoxyethyl group, and specifically a substituted or unsubstituted aryl group such as a phenyl group, an m-methylphenyl group, a p-methoxyphenyl group, a p-cyanophenyl group, a p-carboxyphenyl group, a p-hydroxyphenyl group, a p-mercaptophenyl group, a p-(N,N-dimethylamino)phenyl group, a p-nitrophenyl group, a p-acetylphenyl group, and a 1-naphthyl group; a substituted or unsubstituted heterocyclic group such as a pyridyl group, a quinolyl group, a furyl group, a pyranyl group, a pyrrolyl group, an imidazolyl group, an oxazolyl group, a pyrazolyl group, a thienyl group, a thiazolyl group, an isothiazolyl group, an isoxazolyl group, a pyrimidyl group, a triazinyl group, a benzothiazolyl group, and a benzoxazolyl group; a substituted or unsubstituted acyl group having 1 to 20 carbon atoms, such as a formyl group, an acetyl group, a propionyl group, a butyryl group, an octanoyl group, a benzoyl group, a p-methylbenzoyl group, a 1-naphthoyl group, and a thienoyl group; a substituted or unsubstituted alkylsulfonyl group having 1 to 20 carbon atoms, such as a methylsulfonyl group, an ethylsulfonyl group, a propylsulfonyl group, a butylsulfonyl group, and a 2-methoxyethylsulfonyl group; a substituted or unsubstituted arylsulfonyl group such as a phenylsulfonyl group, a p-methylphenylsulfonyl group, a p-methoxyphenylsulfonyl group, and a 1-naphthylsulfonyl group; a substituted or unsubstituted alkoxycarbonyl group such as a methoxycarbonyl group, an ethoxycarbonyl group, a propoxycarbonyl group, a butoxycarbonyl group, and a benzyloxycarbonyl group; a substituted or unsubstituted aryloxycarbonyl group such as a phenyloxycarbonyl group, a p-methylphenyloxycarbonyl group, and a 1-naphthyloxycarbonyl group; and a cycloalkyloxycarbonyl group such as a cyclohexyloxycarbonyl group and a cyclopentyloxycarbonyl group.

The substituted amino group may have one or two of these substituents. In addition, the nitrogen atom of the amino group and two substituents may be combined to form a 5- or 6-membered ring, and examples of the ring include a morpholine ring, a thiomorpholine ring, a piperidine ring, a piperazine ring, and rings represented by the following structures (II-a) to (II-d), and these rings may have a substituent.

(II-a)

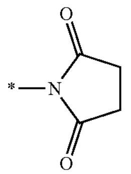

(II-b)

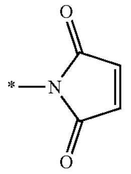

-continued (II-c)

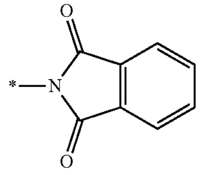

(II-d)

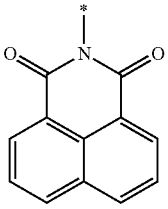

In the structures (II-a) to (II-d), * indicates a bonding portion with an anthraquinone skeleton.

Examples of the substituted or unsubstituted alkoxy group of $R^1$ to $R^8$ include, as the unsubstituted alkoxy group, a linear or branched alkoxy group having 1 to 20 carbon atoms, and specific examples thereof include a methoxy group, an ethoxy group, an isopropoxy group, an n-propoxy group, an isobutoxy group, an n-butoxy group, a pentyloxy group, a hexyloxy group, a 2-ethylhexyloxy group, an n-octyloxy group, an n-decyloxy group, and an n-dodecyloxy group; and as the substituted alkoxy group, the total number of carbon atoms in the substituted alkoxy group is preferably 1 to 20, and examples thereof include a hydroxy-substituted alkoxy group such as a 2-hydroxyethoxy group, a 2-hydroxypropoxy group, a 3-hydroxypropoxy group, and a 4-hydroxybutoxy group; a phenyl-substituted alkoxy group such as a benzyloxy group and a 2-phenylethoxy group; an alkoxy-substituted alkoxy group such as a 2-methoxyethoxy group, a 2-ethoxyethoxy group, a 2-(n)-propoxyethoxy group, a 2-(iso)propoxyethoxy group, a 3-methoxypropoxy group, a 4-methoxybutoxy group, a 3-methoxybutoxy group, a 2,3-dimethoxypropoxy group, and a 2,2-dimethoxyethoxy group; an alkoxyalkoxy-substituted alkoxy group such as a 2-(2-methoxyethoxy)ethoxy group, a 2-(2-ethoxyethoxy)ethoxy group, a 2-(2-(n)-propoxyethoxy) group, a 2-(2-(n)-butoxyethoxy)ethoxy group, and a 2-{2-(2-ethylhexyloxy)ethoxy}ethoxy group; an aralkyloxy-substituted alkoxy group such as a 2-phenethyloxyethoxy group and a 2-benzyloxyethoxy group; an acyloxy-substituted alkoxy group such as a 2-acetyloxyethoxy group and a 2-propionyloxyethoxy group; an alkoxycarbonyl-substituted alkoxy group such as a 2-methoxycarbonylethoxy group and a 2-ethoxycarbonylethoxy group; a heterocyclic-substituted alkoxy group such as a furfuryloxy group and a tetrahydrofurfuryloxy group; an alkenyloxy-substituted alkoxy group such as a 2-allyloxyethoxy group; and an aryloxy-substituted alkoxy group such as a 2-phenoxyethoxy group.

Examples of the substituted or unsubstituted cycloalkyloxy group of $R^1$ to $R^8$ include those having 4 to 7 carbon atoms, such as a cyclopentyloxy group, a cyclohexyloxy group, and a cycloheptyloxy group.

Examples of the substituted or unsubstituted alkenyloxy group of $R^1$ to $R^8$ include linear or branched alkenyloxy groups having 2 to 10 carbon atoms, such as a vinyloxy group, an allyloxy group, a propenyloxy group, a butenyloxy group, and a pentenyloxy group.

Examples of the substituted or unsubstituted aryloxy group of $R^1$ to $R^8$ include a phenoxy group and a naphthoxy group, and examples of substituents thereof include a nitro group; a hydroxy group; a mercapto group; a carboxy group; a cyano group; a thiocyano group; a linear or branched alkyl group having 1 to 10 carbon atoms; a linear or branched alkoxy group having 1 to 10 carbon atoms; and a substituted alkyl group such as a hydroxyethyl group and a methoxyethyl group.

Examples of the substituted or unsubstituted heterocyclic oxy group of $R^1$ to $R^8$ include a pyridyloxy group, a quinolyloxy group, a furyloxy group, a pyranyloxy group, a pyrrolyloxy group, an imidazolyloxy group, an oxazolyloxy group, a pyrazolyloxy group, a thienyloxy group, a thiazolyloxy group, an isothiazolyloxy group, an isooxazolyloxy group, a pyrimidyloxy group, a triazinyloxy group, a benzothiazolyloxy group, and a benzoxazolyloxy group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituted or unsubstituted acyloxy group of $R^1$ to $R^8$ include those having 1 to 20 carbon atoms, such as an acetyloxy group, a propionyloxy group, a butyryloxy group, an octanoyloxy group, a benzoyloxy group, a p-methylbenzoyloxy group, a 1-naphthoyloxy group, and a thienoyloxy group.

Examples of the substituted or unsubstituted alkylsulfonyloxy group of $R^1$ to $R^8$ include those having 1 to 20 carbon atoms, such as a methylsulfonyloxy group, an ethylsulfonyloxy group, a propylsulfonyloxy group, a butylsulfonyloxy group, a pentylsulfonyloxy group, a hexylsulfonyloxy group, a 2-ethylhexylsulfonyloxy group, an n-octylsulfonyloxy group, an n-decylsulfonyloxy group, an n-dodecylsulfonyloxy group, and a 2-methoxyethoxysulfonyloxy group.

Examples of the substituted or unsubstituted arylsulfonyloxy group of $R^1$ to $R^8$ include a phenylsulfonyloxy group, a p-methylphenylsulfonyloxy group, a p-methoxyphenylsulfonyloxy group, and a 1-naphthylsulfonyl group.

Examples of the substituted or unsubstituted alkoxycarbonyloxy group of $R^1$ to $R^8$ include those having 1 to 20 carbon atoms, such as a methoxycarbonyloxy group, an ethoxycarbonyloxy group, a propoxycarbonyloxy group, a butoxycarbonyloxy group, a pentyloxycarbonyloxy group, a hexyloxycarbonyloxy group, a 2-ethylhexyloxycarbonyloxy group, an n-octyloxycarbonyloxy group, an n-decyloxycarbonyloxy group, an n-dodecyloxycarbonyloxy group, and a 2-methoxyethoxycarbonyloxy group.

Examples of the substituted or unsubstituted aryloxycarbonyloxy group of $R^1$ to $R^8$ include a phenoxycarbonyloxy group, a p-methylphenoxycarbonyloxy group, a p-methoxyphenoxycarbonyloxy group, and a 1-naphthoxycarbonyloxy group.

Examples of the substituted or unsubstituted alkoxycarbonyl group of $R^1$ to $R^8$ include, as the unsubstituted alkoxycarbonyl group, linear or branched alkoxycarbonyl groups having 1 to 20 carbon atoms, and specific examples thereof include a methoxycarbonyl group, an ethoxycarbonyl group, an isopropoxycarbonyl group, an n-propoxycarbonyl group, an isobutoxycarbonyl group, an n-butoxycarbonyl group, a pentyloxycarbonyl group, a hexyloxycarbonyl group, a 2-ethylhexyloxycarbonyl group, an n-octyloxycarbonyl group, an n-decyloxycarbonyl group, and an n-dodecyloxycarbonyl group; and as the substituted alkoxycarbonyl group, the total number of carbon atoms in the substituted alkoxy group is preferably 1 to 20, and examples thereof include a hydroxy-substituted alkoxycarbonyl group such as a 2-hydroxyethoxycarbonyl group, a 2 -hydroxypropoxycarbonyl group, a 3-hydroxypropoxycarbonyl group, and a 4-hydroxybutoxycarbonyl group; a phenyl-substituted alkoxycarbonyl group such as a benzyloxycarbonyl group and a 2-phenylethoxycarbonyl group; an alkoxy-substituted alkoxycarbonyl group such as a 2-methoxyethoxycarbonyl group, a 2-ethoxyethoxycarbonyl group, a 2-(n)-propoxyethoxycarbonyl group, a 2-(iso) propoxyethoxycarbonyl group, a 3-methoxyprop oxycarbonyl group, a 4-methoxybutoxycarbonyl group, a 3-methoxybutoxycarbonyl group, a 2,3-dimethoxypropoxycarbonyl group, and a 2,2- dimethoxyethoxycarbonyl group; an alkoxyalkoxy-substituted alkoxycarbonyl group such as a 2-(2 -methoxyethoxy)ethoxycarbonyl group, a 2-(2-ethoxyethoxy)ethoxycarbonyl group, a 2-(2-(n)-propoxyethoxy) carbonyl group, a 2-(2-(n)-butoxyethoxy)ethoxycarbonyl group, and a 2-{(2-ethylhexyloxy)ethoxy}ethoxycarbonyl group; an aralkyloxy-substituted alkoxycarbonyl group such as a 2-phenethyloxyethoxycarbonyl group and a 2-benzyloxyethoxycarbonyl group; an acyloxy-substituted alkoxycarbonyl group such as a 2-acetyloxyethoxycarbonyl group and a 2-propionyloxyethoxycarbonyl group; an alkoxycarbonyl-substituted alkoxycarbonyl group such as a 2-methoxycarbonylethoxycarbonyl group and a 2-ethoxycarbonylethoxycarbonyl group; a heterocyclic-substituted alkoxycarbonyl group such as a furfuryloxycarbonyl group and a tetrahydrofurfuryloxycarbonyl group; an alkenyloxy-substituted alkoxycarbonyl group such as a 2-allyloxyethoxycarbonyl group; and an aryloxy-substituted alkoxycarbonyl group such as a 2-phenoxyethoxycarbonyl group.

Examples of the substituted or unsubstituted cycloalkyloxycarbonyl group of $R^1$ to $R^8$ include those having 4 to 7 carbon atoms, such as a cyclopentyloxycarbonyl group, a cyclohexyloxycarbonyl group, and a cycloheptyloxycarbonyl group.

Examples of the substituted or unsubstituted alkenyloxycarbonyl group of to $R^8$ include a linear or branched alkenyloxycarbonyl group having 2 to 10 carbon atoms, such as a vinyloxycarbonyl group, an allyloxycarbonyl group, a propenyloxycarbonyl group, a butenyloxycarbonyl group, and a pentenyloxycarbonyl group.

Examples of the substituted or unsubstituted aryloxycarbonyl group of $R^1$ to $R^8$ include a phenoxycarbonyl group and a naphthoxycarbonyl group, and examples of substituents thereof include a nitro group; a hydroxy group; a mercapto group; a carboxy group; a cyano group; a thiocyano group; a linear or branched alkyl group having 1 to 10 carbon atoms; a linear or branched alkoxy group having 1 to 10 carbon atoms; and a substituted alkyl group such as a hydroxyethyl group and a methoxyethyl group.

Examples of the substituted or unsubstituted heterocyclic oxycarbonyl group of $R^1$ to $R^8$ include a pyridyloxycarbonyl group, a quinolyloxycarbonyl group, a furyloxycarbonyl group, a pyranyloxycarbonyl group, a pyrrolyloxycarbonyl group, an imidazolyloxycarbonyl group, an oxazolyloxycarbonyl group, a pyrazolyloxycarbonyl group, a thienyloxycarbonyl group, a thiazolyloxycarbonyl group, an isothiazolyloxycarbonyl group, an isoxazolyloxycarbonyl group, a pyrimidyloxycarbonyl group, a triazinyloxycarbonyl group, a benzothiazolyloxycarbonyl group, and a benzoxazolyloxycarbonyl group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituents of the substituted carbamoyl group of $R^1$ to $R^8$ include a substituted or unsubstituted alkyl group having 1 to 20 carbon atoms, such as a methyl group, an ethyl group, a propyl group, a butyl group, an octyl group, a 2-ethylhexyl group, a dodecyl group, a 2-hydroxyethyl group, a 2-methoxyethyl group, a 2-(2-methoxyethoxy)ethyl group, a benzyl group, a 2-phenethyl group, and a tetrahydrofurfuryl group; an alkenyl group having 2 to 20 carbon atoms, such as a vinyl group, an allyl group, a propenyl group, a butenyl group, and a pentenyl group; a cycloalkyl group such as a cyclopentyl group and a cyclohexyl group; a substituted or unsubstituted aryl group which has, as a substituent, a linear or branched alkyl group having 1 to 10 carbon atoms, a linear or branched alkoxy group having 1 to 10 carbon atoms, and a substituted alkyl group such as a hydroxyethyl group and a methoxyethyl group, and specifically a substituted or unsubstituted aryl group such as a phenyl group, an m-methylphenyl group, a p-methoxyphenyl group, a p-cyanophenyl group, a p-carboxyphenyl group, a p-hydroxyphenyl group, a p-mercaptophenyl group, a p-(N,N-dimethylamino)phenyl group, a p-nitrophenyl group, a p-acetylphenyl group, and a 1-naphthyl group; a substituted or unsubstituted heterocyclic group such as a pyridyl group, a quinolyl group, a furyl group, a pyranyl group, a pyrrolyl group, an imidazolyl group, an oxazolyl group, a pyrazolyl group, a thienyl group, a thiazolyl group, an isothiazolyl group, an isoxazolyl group, a pyrimidyl group, a triazinyl group, a benzothiazolyl group, and a benzoxazolyl group; a substituted or unsubstituted acyl group having 1 to 20 carbon atoms, such as a formyl group, an acetyl group, a propionyl group, a butyryl group, an octanoyl group, a benzoyl group, a p-methylbenzoyl group, a 1-naphthoyl group, and a thienoyl group; a substituted or unsubstituted alkylsulfonyl group having 1 to 20 carbon atoms, such as a methylsulfonyl group, an ethylsulfonyl group, a propylsulfonyl group, a butylsulfonyl group, and a 2-methoxyethylsulfonyl group; a substituted or unsubstituted arylsulfonyl group such as a phenylsulfonyl group, a p-methylphenylsulfonyl group, a p-methoxyphenylsulfonyl group, and a 1-naphthylsulfonyl group; a substituted or unsubstituted alkoxycarbonyl group such as a methoxycarbonyl group, an ethoxycarbonyl group, a propoxycarbonyl group, a butoxycarbonyl group, and a benzyloxycarbonyl group; a substituted or unsubstituted aryloxycarbonyl group such as a phenyloxycarbonyl group, a p-methylphenyloxycarbonyl group, and a 1-naphthyloxycarbonyl group; and a cycloalkyloxycarbonyl group such as a cyclohexyloxycarbonyl group and a cyclopentyloxycarbonyl group. The substituted carbamoyl group may have one or two of these substituents. In addition, the nitrogen atom of the carbamoyl group and two substituents may be combined to form a 5- or 6-membered ring, and examples of the ring include a morpholine ring, a thiomorpholine ring, a piperidine ring, a piperazine ring, and rings represented by the following structures (II-a) to (II-d), and these rings may have a substituent.

(II-a)

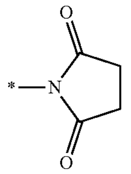

-continued (II-b)

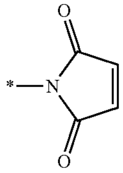

(II-c)

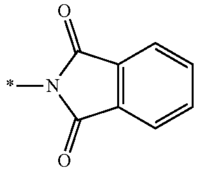

(II-d)

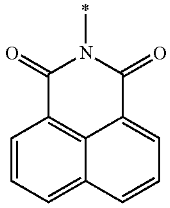

In the structures (II-a) to (II-d), * indicates a bonding portion with an anthraquinone skeleton.

Examples of the substituents of the substituted sulfamoyl group of $R^1$ to $R^8$ include a substituted or unsubstituted alkyl group having 1 to 20 carbon atoms, such as a methyl group, an ethyl group, a propyl group, a butyl group, an octyl group, a 2-ethylhexyl group, a dodecyl group, a 2-hydroxyethyl group, a 2-methoxyethyl group, a 2-(2-methoxyethoxy)ethyl group, a benzyl group, a 2-phenethyl group, and a tetrahydrofurfuryl group; an alkenyl group having 2 to 20 carbon atoms, such as a vinyl group, an allyl group, a propenyl group, a butenyl group, and a pentenyl group; a cycloalkyl group such as a cyclopentyl group and a cyclohexyl group; a substituted or unsubstituted aryl group which has, as a substituent, a linear or branched alkyl group having 1 to 10 carbon atoms, a linear or branched alkoxy group having 1 to 10 carbon atoms, and a substituted alkyl group such as a hydroxyethyl group and a methoxyethyl group, and specifically a substituted or unsubstituted aryl group such as a phenyl group, an m-methylphenyl group, a p-methoxyphenyl group, a p-cyanophenyl group, a p-carboxyphenyl group, a p-hydroxyphenyl group, a p-mercaptophenyl group, a p-(N,N-dimethylamino)phenyl group, a p-nitrophenyl group, a p-acetylphenyl group, and a 1-naphthyl group; a substituted or unsubstituted heterocyclic group such as a pyridyl group, a quinolyl group, a furyl group, a pyranyl group, a pyrrolyl group, an imidazolyl group, an oxazolyl group, a pyrazolyl group, a thienyl group, a thiazolyl group, an isothiazolyl group, an isoxazolyl group, a pyrimidyl group, a triazinyl group, a benzothiazolyl group, and a benzoxazolyl group; a substituted or unsubstituted acyl group having 1 to 20 carbon atoms, such as a formyl group, an acetyl group, a propionyl group, a butyryl group, an octanoyl group, a benzoyl group, a p-methylbenzoyl group, a 1-naphthoyl group, and a thienoyl group; a substituted or unsubstituted alkylsulfonyl group having 1 to 20 carbon atoms, such as a methylsulfonyl group, an ethylsulfonyl group, a propylsulfonyl group, a butylsulfonyl group, and a 2-methoxyethylsulfonyl group; a substituted or unsubstituted arylsulfonyl group such as a phenylsulfonyl group, a p-methylphenylsulfonyl group, a p-methoxyphenylsulfonyl group, and a 1-naphthylsulfonyl group; a substituted or unsubstituted alkoxycarbonyl group such as a methoxycarbonyl group, an ethoxycarbonyl group, a propoxycarbonyl group, a butoxycarbonyl group, and a benzyloxycarbonyl group; a substituted or unsubstituted aryloxycarbonyl group such as a phenyloxycarbonyl group, a p-methylphenyloxycarbonyl group, and a 1-naphthyloxycarbonyl group; and a cycloalkyloxycarbonyl group such as a cyclohexyloxycarbonyl group and a cyclopentyloxycarbonyl group. The substituted sulfamoyl group may have one or two of these substituents. In addition, the nitrogen atom of the sulfamoyl group and two substituents may be combined to form a 5- or 6-membered ring, and examples of the ring include a morpholine ring, a thiomorpholine ring, a piperidine ring, a piperazine ring, and rings represented by the following structures (II-a) to (II-d), and these rings may have a substituent.

(II-a)

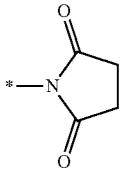

(II-b)

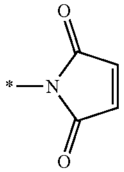

(II-c)

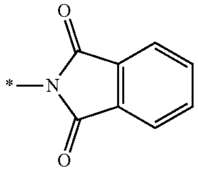

(II-d)

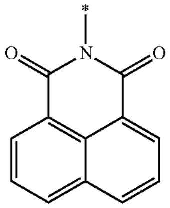

In the structures (II-a) to (II-d), * indicates a bonding portion with an anthraquinone skeleton.

Examples of the substituted or unsubstituted acyl group of $R^1$ to $R^8$ include a substituted or unsubstituted acyl group having 1 to 20 carbon atoms, such as a formyl group, an acetyl group, a propionyl group, a butyryl group, an octanoyl group, a benzoyl group, a p-methylbenzoyl group, a 1-naphthoyl group, and a thienoyl group.

Examples of the substituted or unsubstituted alkylsulfonyl group of $R^1$ to $R^8$ include linear or branched alkylsulfonyl groups having 1 to 20 carbon atoms, and specifically include a methylsulfonyl group, an ethylsulfonyl group, an isopropylsulfonyl group, an n-propylsulfonyl group, an isobutylsulfonyl group, an n-butylsulfonyl group, a pentylsulfonyl group, a hexylsulfonyl group, a 2-ethylhexylsulfonyl group, an n-octylsulfonyl group, an n-decylsulfonyl group, and an n-dodecylsulfonyl group, and these may have a substituent such as a hydroxy group and an alkoxy group.

Examples of the substituted or unsubstituted arylsulfonyl group of $R^1$ to $R^8$ include a phenylsulfonyl group and a naphthylsulfonyl group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituted or unsubstituted alkylthio group of $R^1$ to $R^8$ include linear or branched alkylthio groups having 1 to 20 carbon atoms, and specifically include a methylthio group, an ethylthio group, an isopropylthio group, an n-propylthio group, an isobutylthio group, an n-butylthio group, a pentylthio group, a hexylthio group, a 2-ethylhexylthio group, an n-octylthio group, an n-decylthio group, and an n-dodecylthio group, and these may have a substituent such as a hydroxy group and an alkoxy group.

Examples of the substituted or unsubstituted cycloalkylthio group of $R^1$ to $R^8$ include those having 4 to 7 carbon atoms, such as a cyclopentylthio group, a cyclohexylthio group, and a cycloheptylthio group.

Examples of the substituted or unsubstituted arylthio group of $R^1$ to $R^8$ include a phenylthio group and a naphthylthio group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituted or unsubstituted heterocyclic-thio group of $R^1$ to $R^8$ include a pyridylthio group, a quinolylthio group, a furylthio group, a pyranylthio group, a pyrrolylthio group, an imidazolylthio group, an oxazolylthio group, a pyrazolylthio group, a thienylthio group, a thiazolylthio group, an isothiazolylthio group, an isoxazolylthio group, a pyrimidylthio group, a triazinylthio group, a benzothiazolylthio group, and a benzoxazolylthio group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Examples of the substituted or unsubstituted alkoxysulfonyl group of $R^1$ to $R^8$ include, as the unsubstituted alkoxysulfonyl group, linear or branched alkoxysulfonyl groups having 1 to 20 carbon atoms, and specific examples thereof include a methoxysulfonyl group, an ethoxysulfonyl group, an isopropoxysulfonyl group, an n-propoxysulfonyl group, an isobutoxysulfonyl group, an n-butoxysulfonyl group, a pentyloxysulfonyl group, a hexyloxysulfonyl group, a 2-ethylhexyloxysulfonyl group, an n-octyloxysulfonyl group, an n-decyloxysulfonyl group, and an n-dodecyloxysulfonyl group; and as the substituted alkoxysulfonyl group, the total number of carbon atoms in the substituted alkoxy group is preferably 1 to 20, and examples thereof include a hydroxy-substituted alkoxysulfonyl group such as a 2-hydroxyethoxysulfonyl group, a 2-hydroxypropoxysulfonyl group, a 3-hydroxypropoxysulfonyl group, and a 4-hydroxybutoxysulfonyl group; a phenyl-substituted alkoxysulfonyl group such as a benzyloxysulfonyl group and a 2-phenylethoxysulfonyl group; an alkoxy-substituted alkoxysulfonyl group such as a 2-methoxyethoxysulfonyl group, a 2-ethoxyethoxysulfonyl group, a 2-(n)-propoxyethoxysulfonyl group, a 2-(iso)propoxyethoxysulfonyl group, a 3 -methoxyp rop oxysulfonyl group, a 4-methoxybutoxysulfonyl group, a 3-methoxybutoxysulfonyl group, a 2,3-dimethoxypropoxysulfonyl group, and a 2,2-dimethoxyethoxysulfonyl group; an alkoxyalkoxy-substituted alkoxycarbonyl group such as a 2-(2 -methoxyethoxy)ethoxysulfonyl group, a 2-(2 -ethoxyethoxy)ethoxysulfonyl group, a 2-(2-(n)-propoxyethoxy)sulfonyl group, a 2-(2-(n)-butoxyethoxy) ethoxysulfonyl group, and a 2-{2-(2-ethylhexyloxy) ethoxy}ethoxysulfonyl group; an aralkyloxy-substituted alkoxysulfonyl group such as a 2-phenethyloxyethoxysulfonyl group and a 2-benzyloxyethoxysulfonyl group; an acyloxy-substituted alkoxysulfonyl group such as a 2-acetyloxyethoxysulfonyl group and a 2-propionyloxyethoxysulfonyl group; an alkoxycarbonyl-substituted alkoxysulfonyl group such as a 2-methoxycarbonylethoxysulfonyl group and a 2-ethoxycarbonylethoxysulfonyl group; a heterocyclic-substituted alkoxysulfonyl group such as a furfuryloxysulfonyl group and a tetrahydrofurfuryloxysulfonyl group; an alkenyloxy-substituted alkoxysulfonyl group such as a 2-allyloxyethoxysulfonyl group; and an aryloxy-substituted alkoxysulfonyl group such as a 2-phenoxyethoxysulfonyl group.

Examples of the substituted or unsubstituted cycloalkyloxysulfonyl group of $R^1$ to $R^8$ include those having 4 to 7 carbon atoms, such as a cyclopentyloxysulfonyl group, a cyclohexyloxysulfonyl group, and a cycloheptyloxysulfonyl group.

Examples of the substituted or unsubstituted alkenyloxysulfonyl group of $R^1$ to $R^8$ include linear or branched alkenyloxysulfonyl groups having 2 to 10 carbon atoms, such as a vinyloxysulfonyl group, an allyloxysulfonyl group, a propenyloxysulfonyl group, a butenyloxysulfonyl group, and a pentenyloxysulfonyl group.

Examples of the substituted or unsubstituted aryloxysulfonyl group of $R^1$ to $R^8$ include a phenoxysulfonyl group and a naphthoxysulfonyl group, and examples of substituents thereof include a nitro group; a hydroxy group; a mercapto group; a carboxy group; a cyano group; a thiocyano group; a linear or branched alkyl group having 1 to 10 carbon atoms; a linear or branched alkoxy group having 1 to 10 carbon atoms; and a substituted alkyl group such as a hydroxyethyl group and a methoxyethyl group.

Examples of the substituted or unsubstituted heterocyclic oxysulfonyl group of $R^1$ to $R^8$ include a pyridyloxysulfonyl group, a quinolyloxysulfonyl group, a furyloxysulfonyl group, a pyranyloxysulfonyl group, a pyrrolyloxysulfonyl group, an imidazolyloxysulfonyl group, an oxazolyloxysulfonyl group, a pyrazolyloxysulfonyl group, a thienyloxysulfonyl group, a thiazolyloxysulfonyl group, an isothiazolyloxysulfonyl group, an isoxazolyloxysulfonyl group, a pyrimidyloxysulfonyl group, a triazinyloxysulfonyl group, a benzothiazolyloxysulfonyl group, and a benzoxazolyloxysulfonyl group, and examples of substituents thereof include a linear or branched alkyl group having 1 to 10 carbon atoms, a linear or branched alkoxy group having 1 to 10 carbon atoms, and a substituted alkyl group such as a hydroxyethyl group and a methoxyethyl group.

Among $R^1$ to $R^8$, $R^1$ and $R^4$ are each independently preferably a substituted or unsubstituted amino group, and $R^2$, $R^3$ and $R^5$ to $R^8$ are each independently preferably a hydrogen atom or a substituent. Specific examples of the substituent are as described above.

Examples of the compound in which $R^2$ and $R^3$ are bonded to each other to form a ring include a compound having a structure represented by the following general formula (III).

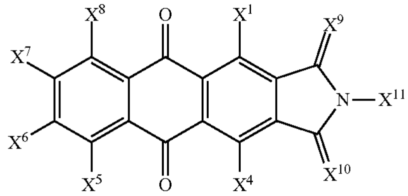

(III)

In the formula, $X^1$ and $X^4$ to $X^8$ have the same meaning as $R^1$ and $R^4$ to R8 in the formula (I), respectively. $X^9$ and $X^{10}$ represent an oxygen atom, s sulfur atom, or NH, and $X^{11}$ represents a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group.

The substituted or unsubstituted alkyl group, the substituted or unsubstituted cycloalkyl group, the substituted or unsubstituted alkoxy group, and the substituted or unsubstituted aryl group in $X^{11}$ of the formula (III) are as described in $R^1$ to $R^8$. Examples of the aralkyl group in the substituted or unsubstituted aralkyl group include an aralkyl group having 7 to 20 carbon atoms. Examples of the substituent of the substituted aralkyl group include an alkyl group having 1 to 15 carbon atoms, an alkoxy group having 1 to 15 carbon atoms, a hydroxy group, an amino group, a dimethylamino group, a diethylamino group, a halogen atom, a sulfo group, and a carboxy group. Specific examples of the aralkyl group include a benzyl group, a phenethyl group, an α-methylbenzyl group, an α-methylphenylethyl group, a β-methylphenylethyl group, and a fluorenyl group.

Among the compounds represented by the general formula (III), a compound represented by the following general formula (III-a) is preferable.

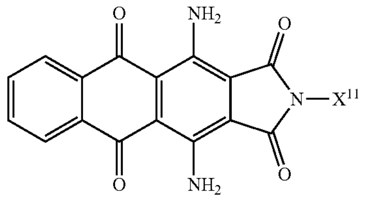

(III-a)

In the formula, $X^{11}$ is as described above.

$X^{11}$ preferably has 1 to 20 carbon atoms, more preferably 2 to 10 carbon atoms, and still more preferably 2 to 6 carbon atoms. In particular, $X^{11}$ preferably has 2 to 6 carbon atoms and is a substituted or unsubstituted alkyl group, and from the viewpoint of fastness, $X^{11}$ is more preferably an alkoxy group-substituted alkyl group such as a 2-methoxyethyl group and a 3-methoxypropyl group.

The halogen-free anthraquinone-based blue dye used in the present invention is also preferably a compound represented by the following general formula (IV).

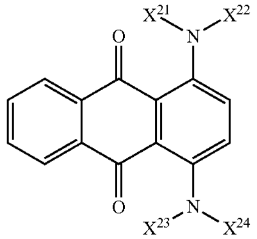

(IV)

In the formula, $X^{21}$ to $X^{24}$ each independently represent a hydrogen atom, a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group.

The substituted or unsubstituted alkyl group, the substituted or unsubstituted cycloalkyl group, the substituted or unsubstituted alkoxy group, and the substituted or unsubstituted aryl group in $X^{21}$ to $X^{24}$ of the general formula (IV) are as described in $R^1$ to $R^8$, and the substituted or unsubstituted aralkyl group is as described in $X^{11}$.

In the general formula (IV), when each of $X^{21}$ to $X^{24}$ is a group other than a hydrogen atom, the number of carbon atoms is preferably 1 to 20, more preferably 6 to 15, and still more preferably 8 to 14.

Among the compounds represented by the general formula (IV), compounds represented by the following general formula (IV-a) in which $X^{21}$ and $X^{23}$ are a hydrogen atom are preferable, and in particular, compounds in which $X^{22}$ and $X^{24}$ are each selected from a phenyl group and a substituted or unsubstituted aryl group are more preferable, and compounds in which $X^{22}$ and $X^{24}$ are each selected from a 2,4,6-trimethylphenyl group and a 2,6-diethyl-4-methylphenyl group are still more preferable from the viewpoint of fastness.

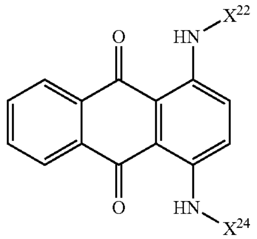

(IV-a)

In the formula, $X^{22}$ and $X^{24}$ are each as described above.

Further, the halogen-free anthraquinone-based blue dye used in the present invention is preferably a compound represented by the following formula (V).

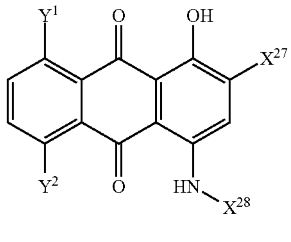

(V)

In the formula, $X^{27}$ and $X^{28}$ each independently represent a hydrogen atom, a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group. One of $Y^1$ and $Y^2$ is a hydroxy group and the other is a nitro group ($—NO_2$) or an amino group ($—NH_2$), or both are a hydrogen atom.

The substituted or unsubstituted alkyl group, the substituted or unsubstituted cycloalkyl group, the substituted or unsubstituted alkoxy group, and the substituted or unsubstituted aryl group in $X^{27}$ and $X^{28}$ of the general formula (V) are as described in $R^1$ to $R^8$, and the substituted or unsubstituted aralkyl group is as described in X.

When each of $X^{27}$ and $X^{28}$ is a group other than a hydrogen atom, the number of carbon atoms is preferably 1 to 20, more preferably 4 to 15, and still more preferably 6 to 14.

Among the compounds represented by the general formula (V), compounds represented by the following general formulae (V-a) to (V-c) are more preferable.

(V-a)

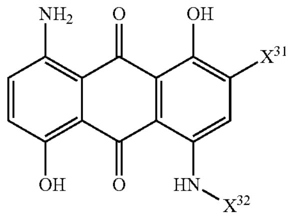

(V-b)

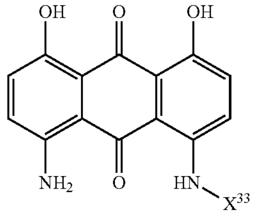

(V-c)

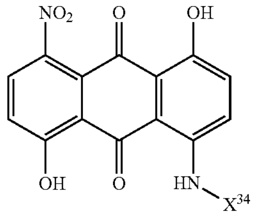

In the formulae, $X^{31}$ to $X^{34}$ each independently represent a hydrogen atom, a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group.

The substituted or unsubstituted alkyl group, the substituted or unsubstituted cycloalkyl group, the substituted or unsubstituted alkoxy group, and the substituted or unsubstituted aryl group in $X^{31}$ to $X^{34}$ of the general formulae (V-a) to (V-c) are as described in $R^1$ to $R^8$, and the substituted or unsubstituted aralkyl group is as described in $X^{11}$.

In the general formulae (V-a) to (V-c), when each of $X^{31}$ to $X^{34}$ is a group other than a hydrogen atom, the number of carbon atoms is preferably 1 to 20, more preferably 4 to 15, and still more preferably 6 to 14.

Among the compounds represented by the general formulae (V-a) to (V-c), in the compound represented by the general formula (V-a), a compound in which $X^{31}$ is a 4-(2-ethoxyethoxy)phenyl group and $X^{32}$ is a hydrogen atom, a compound in which $X^{31}$ is a 4-hydroxyphenoxy group and $X^{32}$ is a hydrogen atom, or a compound in which $X^{31}$ is a 4-methoxyphenoxy group and $X^{32}$ is a hydrogen atom is preferred from the viewpoint of improving light resistance. In addition, in the compound represented by the general formula (V-b), a compound in which $X^{33}$ is a 2-hydroxyethylphenyl group or a compound in which $X^{33}$ is a phenyl group is also preferable. Further, in the compound represented by the general formula (V-c), a compound in which $X^{34}$ is a phenyl group is also preferable.

However, in the present invention, a compound other than the compound represented by the general formula (I) can be used as the halogen-free anthraquinone-based blue dye.

Specific examples of the halogen-free anthraquinone-based blue dye include Disperse Blue 3, Disperse Blue 5, Disperse Blue 14, Disperse Blue 26, Disperse Blue 28, Disperse Blue 35, Disperse Blue 334, Disperse Blue 359, Disperse Blue 60, Disperse Blue 72, Disperse Blue 73, Disperse Blue 77, Disperse Blue 214, Disperse Blue 167, Disperse Blue 54, SolventBlue 101, SolventBlue 102, SolventBlue 104, SolventBlue 122, SolventBlue 35, SolventBlue 36, SolventBlue 59, SolventBlue 63, SolventBlue 68, SolventBlue 78, and SolventBlue 97.

Among them, as preferred compounds, examples of the dye containing the compound represented by the general formula (III-a) include Disperse Blue 60. Further, examples of the dye containing the compound represented by the general formula (IV) include Solvent Blue 104 and Solvent Blue 97. Furthermore, examples of the dye containing the compound represented by the general formula (V) include Disperse Blue 214, Disperse Blue 167, and Disperse Blue 54.

The above-mentioned dyes may be used alone or in combination of two or more kinds thereof.

The content of the halogen-free blue dye in the polyester layer (A) is preferably 0.01 to 2.0% by mass, more preferably 0.02 to 1.5% by mass, and still more preferably 0.05 to 1.0% by mass. When the content of the halogen-free blue dye is equal to or greater than the lower limit value, design property can be sufficiently imparted to the polyester film. On the other hand, when the content of the halogen-free blue dye is equal to or less than the upper limit value, the haze of the polyester film can be suppressed to be low.

The content of the halogen-free blue dye in the polyester film is preferably 0.01 to 2.0% by mass, more preferably 0.02 to 1.5% by mass, and still more preferably 0.05 to 1.0% by mass.

<Other Coloring Materials>

In the present invention, other halogen-free coloring materials other than the above-mentioned halogen-free blue dye may be used. The other coloring materials are preferably those which are soluble in the polyester and are less decomposed at the molding temperature of the polyester. Preferred examples of such a coloring material include perinone-based, perylene-based, azomethine-based and heterocyclic dyes in terms of chemical structure. These dyes can be appropriately selected and used by mixing several kinds in order to adjust the color to, for example, a smoke tone or a brown tone.

The content of other coloring materials in the polyester film is usually preferably 0.01 to 5% by mass, and more preferably 0.05 to 2% by mass.

<Pigment>

The polyester layer (A) in the present invention contains a pigment. In the present invention, by using a pigment, it is possible to impart light shielding property to a polyester film. When the pigment and the halogen-free blue dye are used in combination, the haze of the polyester film can be suppressed to a low level, and the light resistance of the polyester layer (A) is also improved.

Preferred examples of the pigment used in the polyester layer (A) include black pigments and white pigments having high hiding power from the viewpoint of the light shielding property of the polyester film. In particular, by using a black pigment having a high hiding power, the light shielding property of the polyester film can be improved even with a small amount thereof, and the haze of the polyester film can be suppressed to a low level with a small amount thereof.

Examples of the pigment include organic pigments and inorganic pigments, and from the viewpoint of light shielding property and stability, carbon black and carbon nanotube, which are carbon-based black pigments, are preferable, and carbon black is more preferable.

As the carbon black which can be used in the present invention, furnace black, channel black, acetylene black and the like can be used.

The average primary particle diameter of the carbon black used in the present invention is preferably 5 to 100 nm, more preferably 10 to 50 nm, and still more preferably 15 to 40 nm.

When the average primary particle diameter is equal to or less than the upper limit value, the haze of the film can be suppressed to be low, and the transparency of the film is improved. On the other hand, carbon black particles may be present as an aggregate in which fine primary particles are aggregated. However, when biaxial stretching is performed in a state where the aggregate is present in polyester, a stretching stress applied to the film also acts on the aggregate to cause a phenomenon in which the aggregate is dispersed. When the average primary particle diameter is equal to or greater than the lower limit value, the cohesive force between the primary particles does not become too strong, and the aggregate is easily dispersed by the stretching stress when the film is stretched.

The average primary particle diameter in the present invention is a particle diameter measured by observing particles of carbon black alone or present in the polyester with an electron microscope, and when the particles are present as an aggregate, refers to the particle diameter of the primary particles constituting the aggregate.

Examples of the white pigment include inorganic white pigments such as inorganic oxides, barium sulfate, and calcium carbonate, and examples of the inorganic oxides include titanium oxide, zinc oxide, magnesium oxide, silica, and alumina. Among these, inorganic oxides are preferable, and silica and alumina are preferable from the viewpoint that the whiteness is high and the light shielding property can be improved.

When silica and/or alumina are used, the average particle diameter of silica and alumina in the polyester layer (A) is preferably 0.01 to 3 μm, more preferably 0.05 to 2 μm, and still more preferably 0.1 to 1 μm. When the average particle diameter of silica and alumina in the polyester layer (A) is equal to or less than the upper limit value, dispersibility in the polyester layer (A) is improved, and haze of the polyester film is improved. In addition, when the average particle diameter of silica and alumina in the polyester layer (A) is equal to or greater than the lower limit value, it is easy to secure light shielding property.

The particle diameter can be measured by the same method as the method for measuring the particle diameter of carbon black.

The content of the pigment in the polyester layer (A) is preferably 0.001 to 1.2% by mass, more preferably 0.005 to 0.05% by mass, still more preferably 0.01 to 0.3% by mass, yet still more preferably 0.02 to 0.1% by mass, and particularly preferably 0.03 to 0.1% by mass. In the present invention, since the pigment and the blue dye are used in combination, even if the amount of the pigment is small as described above, the haze can be reduced while imparting the light shielding property to the polyester film. In addition, the light resistance of the polyester layer (A) is also improved.

The content of the pigment in the polyester film is preferably 0.001 to 1.2% by mass, more preferably 0.005 to 0.5% by mass, still more preferably 0.01 to 0.3% by mass, and particularly preferably 0.02 to 0.1% by mass.

<Layer Configuration>

The polyester film of the present invention is not particularly limited as long as it has the polyester layer (A), and may be a single layer, but preferably has the polyester layer (B) on at least one side of the polyester layer (A), and more preferably has the polyester layer (B) on both sides of the polyester layer (A). By having the polyester layer (B), bleeding out of the coloring material can be suppressed, and furthermore, the polyester layer (A) is protected and durability and the like are improved.

The detailed description of the polyester used in the polyester layer (B) is the same as that of the polyester in the polyester layer (A) described above, and the description thereof will be omitted. The polyester used in the polyester layer (B) may be the same as or different from the polyester used in the polyester layer (A).

It is preferable that fine particles are blended in the polyester layer (B). By blending the fine particles, the sliding property of the surface of the polyester film can be improved.

Examples of the fine particles to be blended in the polyester layer (B) include silica, silicon oxide, calcium carbonate, kaolin, and organic polymer particles, and silica is preferable from the viewpoint of effectively improving the sliding property of the surface and from the viewpoint of production cost.

The average particle diameter of the fine particles in the polyester layer (B) is preferably 0.01 to 5.0 μm, and more preferably 0.1 to 3.0 μm.

When the fine particles are in the form of a powder, the average particle diameter of the fine particles can be defined as the particle diameter (d50) at a cumulative volume fraction of 50% in an equivalent spherical distribution obtained by measuring the powder using a centrifugal sedimentation type particle size distribution analyzer (SA-CP3 type). The average particle diameter of the fine particles in the film or the resin chip is determined by observing the film or the resin chip using, for example, a scanning electron microscope ("S3400N" manufactured by Hitachi High-Tech Corporation), measuring the size of one of the particles from the obtained image data, and averaging 10 points (10 particles).

When the fine particles are blended in the polyester layer (B), the blending amount thereof is preferably 0.001 to 0.5% by mass and more preferably 0.01 to 0.4% by mass in the total amount of the materials constituting the surface layer. When the amount of the fine particles in the polyester layer (B) is within the above range, the sliding property can be improved and the haze of the polyester film can be suppressed to be low.

Note that each of the polyester layer (A) and the polyester layer (B) may contain, in addition to the above-described dye, pigment, and fine particles, a conventionally known antioxidant, ultraviolet absorber, heat stabilizer, lubricant, or the like as necessary.

In particular, from the viewpoint of light resistance, when a white pigment is used as the pigment, it is preferable to blend an ultraviolet absorber in at least one of the polyester layer (A) and the polyester layer (B), particularly in the polyester layer (A).

<Thickness>

The thickness of the polyester layer (A) in the present invention is not particularly limited, but is preferably 5 to 50 μm, more preferably 10 to 40 μm, and still more preferably 15 to 35 μm.

The polyester layer (B) constituting the surface layer is preferably as thin as possible in order to secure high transparency and suppress turbidity of the entire polyester film, but preferably has a certain thickness from the viewpoint of preventing the coloring material in the polyester layer (A) as an intermediate layer from bleeding out. In consideration of these, the thickness of the polyester layer (B) is usually preferably 0.5 to 8.0 μm on one side, and more preferably 1.0 to 5.0 μm.

The ratio of the thickness of the polyester layer (B) to the thickness of the polyester layer (A), [(B)/(A)], is preferably 0.05 to 0.5. When the thickness ratio is within the above range, the bleeding out of the coloring material from the polyester layer (A) can be suppressed while maintaining the transparency of the polyester film. From this viewpoint, the thickness ratio [(B)/(A)] is more preferably 0.07 to 0.4, and still more preferably 0.08 to 0.3.

<Easily Adhesive Layer>

The polyester film of the present invention may have an easily adhesive layer on the outermost surface. By providing the easily adhesive layer, a functional layer or the like is easily adhered to the polyester film The easily adhesive layer is preferably provided on the surface of the polyester layer (B) opposite to the side on which the polyester layer (A) is provided. The easily adhesive layer is formed from an easily adhesive layer composition containing a binder resin and a crosslinking agent. When the polyester layer (B) is provided on both surfaces of the polyester layer (A), the easily adhesive layer may be provided on the surfaces of both polyester layers (B), but may be provided on the surface of one polyester layer (B).

Examples of the binder resin include a polyester resin, an acrylic resin, a urethane resin, a polyvinyl resin such as polyvinyl alcohol, a polyalkylene glycol, a polyalkylene imine, methyl cellulose, hydroxy cellulose, and starches. Among these, a polyester resin, an acrylic resin, and a urethane resin are preferably used from the viewpoint of improving adhesion to the functional layer or the like.

As the crosslinking agent, various known crosslinking agents can be used, and examples thereof include an oxazoline compound, a melamine compound, an epoxy compound, an isocyanate-based compound, a carbodiimide-based compound, and a silane coupling compound. Among these, an oxazoline compound is preferably used from the viewpoint of improving durable adhesion. In addition, a melamine compound is preferably used from the viewpoint of improving durability and coating property of the easily adhesive layer.

The easily adhesive layer composition may contain particles for the purpose of improving blocking resistance and sliding property. Specific examples of the particles include silica, alumina, kaolin, calcium carbonate, and organic polymer particles. Among them, silica is preferable from the viewpoint of transparency. The average particle diameter of the particles is preferably in a range of 0.005 to 1.0 μm, more preferably 0.01 to 0.5 μm, and still more preferably 0.01 to 0.2 μm, from the viewpoint of improving the transparency and sliding property of the polyester film. Note that the average particle diameter is a value of 50% (D50) of the cumulative (weight basis) in an equivalent spherical distribution measured using a centrifugal sedimentation type particle size distribution analyzer.

In addition, a component for promoting crosslinking, such as a crosslinking catalyst, may be blended in the easily adhesive layer composition.

In general, the easily adhesive layer composition is preferably diluted with water, an organic solvent, or a mixed solution thereof, and the easily adhesive layer may be formed by coating a diluted solution of the easily adhesive layer composition on the outermost surface of the polyester film as a coating solution and drying the coating solution. The coating may be performed by a conventionally known method.

The thickness of the easily adhesive layer is usually in a range of 0.003 to 1 μm, preferably in a range of 0.005 to 0.6 μm, and more preferably in a range of 0.01 to 0.4 μm. When the thickness is 0.003 μm or more, sufficient adhesiveness can be secured. When the thickness is 1 μm or less, deterioration of appearance, blocking, and the like are less likely to occur.

<Visible Light Transmittance>

The visible light transmittance of the polyester film of the present invention is preferably 2 to 80%, more preferably 20 to 60%, and still more preferably 30 to 50%. When the visible light transmittance of the polyester film is equal to or greater than the lower limit value, the film has appropriate light shielding property, and thus does not become too dark as a film for window attachment. On the other hand, when the visible light transmittance is equal to or less than the upper limit value, it is preferable because it is not too bright. The visible light transmittance can be adjusted within the above range by adjusting the amounts of the halogen-free blue dye and the pigment.

<Haze>

The polyester film of the present invention preferably has a haze of 5.0% or less, more preferably 4.0% or less, and still more preferably 3.5% or less. When the haze is equal to or less than the upper limit value, turbidity is less likely to occur in a field of view seen through the polyester film, and sufficient transparency can be secured.

The haze can be adjusted within the above range by adjusting the amounts of the halogen-free blue dye and the pigment.

<Method for Producing Polyester Film for Window Attachment>

Next, a method for producing the polyester film for window attachment of the present invention will be specifically described, but the method is not limited to the following production example.

First, the dye and the pigment are added to the polyester. The method of addition is not particularly limited, but it is preferable to prepare a master batch of the dye or the pigment and add the master batch during melt molding of the film. In addition, it is particularly preferable to use a twin-screw extruder at the time of melt molding in order to carry out the melt molding while kneading the polyester with good dispersion.

When the polyester film for window attachment of the present invention has the polyester layer (A) and the polyester layer (B), the raw materials are respectively charged into a plurality of extruders, the respective polyesters are laminated using a multi-manifold die or a feed block of a plurality of layers, a molten sheet of a plurality of layers is extruded from a die, and cooled and solidified by a cooling roll to obtain an unstretched sheet. In this case, in order to improve the flatness of the sheet, it is preferable to increase the adhesiveness between the sheet and the rotary cooling drum, and it is preferable to adopt an electrostatic application adhesion method and/or a liquid application adhesion method.

Then, the obtained unstretched film is stretched in a biaxial direction to orient it in a biaxial direction. That is, the unstretched sheet is stretched in the longitudinal direction by a roll stretching machine. The stretching temperature is usually 70 to 120° C., and preferably 80 to 110° C., and the stretching ratio is usually 2.5 to 7.0 times, and preferably 3.0 to 6.0 times.

Stretching is then carried out in the transverse direction. The stretching temperature is usually 70 to 120° C., and preferably 80 to 115° C., and the stretching ratio is usually 3.0 to 7.0 times, and preferably 3.5 to 6.0 times. Subsequently, heat treatment is performed at a temperature of 170 to 250° C. under tension or relaxation of 30% or less to obtain a biaxially stretched film.

In the above stretching, a method in which stretching in one direction is performed in two or more stages can also be used. In this case, it is preferable that the stretching ratio in each of the two directions is finally within the above-mentioned range. In addition, the unstretched sheet may be subjected to simultaneous biaxial stretching so that the area magnification becomes 10 to 40 times. If necessary, the film may be stretched again in the longitudinal and/or transverse directions before or after the heat treatment.

The surface of the polyester film obtained by the above-described method can be coated as necessary, and the above-described easily adhesive layer may be formed by coating. The coating can be carried out in-line, off-line or a combination of both, but is preferably carried out in-line. In the in-line coating, a series of processes can be used in which a coating solution diluted mainly with water is applied at the stage where the longitudinal stretching is completed, and then drying, preheating, and transverse stretching are performed in a tenter, followed by thermal fixing.

[Polyester Film Laminate for Window Attachment]

In the polyester film laminate for window attachment of the present invention, a functional layer is provided on at least one surface of the polyester film in order to impart various functions to the polyester film, and a pressure-sensitive adhesive layer is preferably provided as the functional layer. That is, the polyester film laminate for window attachment of the present invention preferably includes a polyester film and a pressure-sensitive adhesive layer provided on the surface of the polyester film. Since the polyester film laminate for window attachment includes the pressure-sensitive adhesive layer, the polyester film for window attachment can be easily bonded to the window glass.

The pressure-sensitive adhesive layer may be composed of various pressure-sensitive adhesives such as an acrylic pressure-sensitive adhesive, a polyester-based pressure-sensitive adhesive, a rubber-based pressure-sensitive adhesive, and a silicone-based pressure-sensitive adhesive. Among these, an acrylic pressure-sensitive adhesive is preferable from the viewpoint of adhesive force, contamination to an adherend, and cost.

The thickness of the pressure-sensitive adhesive layer is preferably 1 to 100 μm, more preferably 5 to 75 μm, and still more preferably 15 to 50 μm. When the thickness of the pressure-sensitive adhesive layer is within the above range, transparency can be secured while sufficiently maintaining the strength of the pressure-sensitive adhesive layer.

On the other hand, a single polyester film may be used, or polyester films may be bonded to each other via a pressure-sensitive adhesive layer. In the bonding configuration, polyester films having the same color tone may be bonded to each other, or polyester films having different color tones may be bonded to each other. In this case, there is an advantage in that the number of items (color lineup) of the obtained polyester film laminate for window attachment is increased.

In addition, in the polyester film laminate for window attachment of the present invention, a hard coat layer may be provided as a functional layer on the surface of the polyester film. By providing the hard coat layer, the surface of the polyester film can be prevented from being damaged.

The hard coat layer is preferably a cured product layer formed by curing a known hard coat agent. The hard coat agent is not particularly limited, and an active energy ray-curable composition or the like may be used. Note that the active energy ray means an active ray such as an ultraviolet ray or an electron beam.

The hard coat agent preferably contains a polymerizable monomer, a polymerizable oligomer, or the like that forms a cured product upon irradiation with active energy rays, and may contain, for example, at least one of a (meth)acrylate monomer and a (meth)acrylate oligomer. More specifically, the hard coat agent may contain urethane (meth)acrylate, polyester (meth)acrylate, epoxy (meth) acrylate, melamine (meth) acrylate, polyfluoroalkyl (meth) acrylate, silicone (meth)acrylate, or the like.

The hard coat agent may contain additives such as a crosslinking agent, a polymerization initiator, a lubricant, a plasticizer, organic particles, inorganic particles, an antifouling agent, an antioxidant, and a catalyst, if necessary.

The thickness of the hard coat layer is not particularly limited, but is, for example, in a range of 0.5 to 15 μm, and preferably 1 to 10 μm.

In the case where a hard coat layer is provided in the polyester film laminate for window attachment of the present invention, it is preferable that a pressure-sensitive adhesive layer be provided on one surface of the polyester film and a hard coat layer be provided on the other surface. With such a configuration, it is possible to prevent the surface of the polyester film adhered to the window glass via the pressure-sensitive adhesive layer from being scratched by the hard coat layer.

When a functional layer such as a pressure-sensitive adhesive layer or a hard coat layer is provided, the surface of the polyester film on which the functional layer is provided may be subjected to corona discharge treatment or provided with the above-described easily adhesive layer in order to improve adhesion. In addition, when a hard coat layer is provided, the above-described easily adhesive layer is preferably provided on the surface of the polyester film on which the hard coat layer is provided, from the viewpoint of improving adhesiveness.

When the polyester film laminate for window attachment has a pressure-sensitive adhesive layer, the polyester film laminate may further have a release film laminated on the surface of the pressure-sensitive adhesive layer. Since the polyester film laminate for window attachment has the release film, the pressure-sensitive adhesive layer can be protected before bonding to a window glass. In addition, when the polyester film laminate for window attachment is bonded to a window glass, the release film may be peeled off and the polyester film may be bonded to the window glass by the exposed pressure-sensitive adhesive layer which is peeled and exposed.

Examples of the release film include films surface-treated with a release agent such as a silicone-based release agent or a non-silicone-based release agent such as a long-chain alkyl-based resin or an olefin-based resin.

The polyester film for window attachment and the polyester film laminate for window attachment of the present invention are used by being bonded to a window glass of various vehicles such as automobiles and buildings. The polyester film for window attachment of the present invention has good light resistance and can reduce discoloration even after long-term use. In addition, since a halogen-free blue dye is used, there is no adverse effect on the environment when discarded.

<Description of Terms>

Generally, the term "sheet" refers to a thin, flat product whose thickness is small for its length and width, and the term "film" refers to a thin, flat product whose thickness is extremely small compared to its length and width and whose maximum thickness is arbitrarily limited, usually supplied in the form of a roll, as defined in JIS (Japanese Industrial Standards; JIS K6900). However, since the boundary between the sheet and the film is not clear and it is not necessary to distinguish the two in terms of language in the present invention, the term "film" includes the term "sheet" and the term "sheet" includes the term "film" in the present invention.

In addition, in the description herein, when "X to Y" (X and Y are arbitrary numbers) is described, the meaning of "greater than or equal to X and less than or equal to Y" and the meaning of "preferably greater than X" or "preferably less than Y" are included unless otherwise specified.

In addition, when "X or more" (X is an arbitrary number) is described, the meaning of "preferably larger than X" is included unless otherwise specified, and when "Y or less" (Y is an arbitrary number) is described, the meaning of "preferably smaller than Y" is also included unless otherwise specified.

EXAMPLES

The present invention will be described in more detail with reference to Examples, but the present invention is not limited to these Examples.

[Evaluation Method]

The polyester films obtained in Examples and Comparative Examples were evaluated according to the following methods, respectively.

(1) Visible Light Transmittance

The light transmittance of each wavelength was measured using a spectral colorimeter SE-2000 (manufactured by Nippon Denshoku Industries Co., Ltd.), and the visible light transmittance was calculated in accordance with JIS-A5759.

(2) Film Turbidity (Haze)

The turbidity (haze) of the polyester film was measured using a haze meter NDH300A (manufactured by Nippon Denshoku Industries Co., Ltd.) in accordance with JIS-K6714.

(3) Thickness of Polyester Film and Thickness of Each Layer

A small piece of the polyester film was embedded in an epoxy resin, and a section was cut out with a microtome so that a cross section in the thickness direction could be observed. The section was observed with a transmission electron microscope photograph. In the cross section, a lamination interface is observed by contrast substantially parallel to the film surface. The distance between the interface and the film surface was measured by a transmission electron microscope photograph, and the average value calculated from all the measured values was taken as the thickness.

(4) Color Difference (Light Resistance)

The polyester film before the test was measured using a color difference meter (CR-410 type using C light source, manufactured by Konica Minolta, Inc.), and L*, a*, and b* were calculated in accordance with JISZ8781-4.

Thereafter, the polyester film was irradiated with UV light under the following conditions using a metal weather tester (KW-R5TP-A type manufactured by Daipla Wintes Co., Ltd.).

Also for the polyester film after the test, L*, a*, and b* were calculated in the same manner as before the test, and the color difference $\Delta E^*_{ab}$ between before and after the test was calculated using the following equation.

It can be seen that the smaller $\Delta E^*_{ab}$ is, the less the color change (discoloration) due to UV light irradiation is and the more excellent the light resistance is.

<Measurement Conditions>

Illuminance 140 $mW/cm^2$, irradiation time 32 hours (LIGHT (50° C., 50% RH))

$$\text{Equation: } \Delta E^*_{ab}=[(\Delta L^*)^2+(\Delta a^*)^2+(\Delta b^*)^2]^{1/2}$$

The above measurement conditions correspond to about 9 months of normal outdoor exposure.

(5) Intrinsic Viscosity of Polyester 1 g of polyester from which other components incompatible with polyester were removed was precisely weighed, dissolved by adding 100 mL of a mixed solvent of phenol and tetrachloroethane [phenol/tetrachloroethane=50/50 (mass ratio)], and measured at 30° C.

(6) Average Particle Diameter of Fine Pparticles

Using a centrifugal sedimentation type particle size distribution analyzer (SA-CP3 type) manufactured by Shimadzu Corporation, a particle diameter at the cumulative volume fraction of 50% in the equivalent spherical distribution obtained by measuring fine particles was defined as an average particle diameter.

[Raw Material]

<Polyester A>

Polyester A is a polyethylene terephtalate monopolymer having an intrinsic viscosity of 0.63 dL/g.

<Polyester B>

Polyester B is a polyethylene terephthalate monopolymer containing 0.6% by mass of amorphous silica particles having an average particle diameter of 2.3 μm and having an intrinsic viscosity of 0.61 dL/g.

<Polyester C>

Polyester C is a polyester obtained by melting and mixing polyethylene terephthalate and coloring materials to form chips. More specifically, Polyester C is obtained by mixing polyethylene terephthalate and coloring materials at a ratio (mass ratio) of 90:10.

The contents of the coloring materials in Polyester C are 4.5% by mass of Disperse Blue 60, 1.5% by mass of Solvent Brown 53, and 0.8% by mass of carbon black (average primary particle diameter of 30 nm). Polyester C also contains Solvent Red 52.

Disperse Blue 60 used for Polyester C is a halogen-free anthraquinone-based blue dye and has the following structural formula.

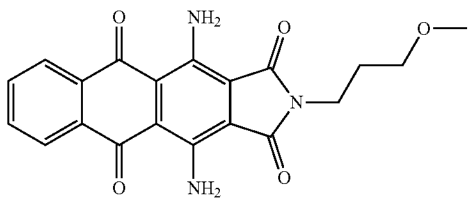 [SMILES: COCCCn1c(=O)c2c(N)c3c(=O)c4ccccc4c(=O)c3c(N)c2c1=O]

<Polyester D>

Polyester D is a polyester obtained by melting and mixing polyethylene terephthalate and coloring materials to form chips. More specifically, Polyester D is obtained by mixing polyethylene terephthalate and coloring materials at a ratio (mass ratio) of 85:15.

The contents of the coloring materials in Polyester D are 7% by mass of Disperse Blue 60, 6% by mass of Solvent Brown 53, and Solvent Red 52.

<Polyester E>

Polyester E is a polyester obtained by melting and mixing polyethylene terephthalate and coloring materials to form chips. More specifically, Polyester E is obtained by mixing polyethylene terephthalate and coloring materials at a ratio (mass ratio) of 90:10.

The contents of the coloring materials in Polyester E are 4.5% by mass of Disperse Blue 60, 1.5% by mass of Solvent Brown 53, and 0.6% by mass of silica (average particle diameter of 2.3 μm). Polyester E also contains Solvent Red 52.

<Polyester F>

Polyester F is a polyester obtained by melting and mixing polyethylene terephthalate and coloring materials to form chips. More specifically, Polyester F is obtained by mixing polyethylene terephthalate and coloring materials at a ratio (mass ratio) of 90:10.

The contents of the coloring materials in Polyester F are 4.5% by mass of Disperse Blue 60, 1.5% by mass of Solvent Brown 53, and 0.8% by mass of alumina (average particle diameter of 0.05 μm). Polyester F also contains Solvent Red 52.

<Polyester G>

Polyester G is a polyester obtained by melting and mixing polyethylene terephthalate and coloring materials to form chips. More specifically, Polyester G is obtained by mixing polyethylene terephthalate and coloring materials at a ratio (mass ratio) of 90:10.

The contents of the coloring materials in Polyester G are 4.0% by mass of Solvent Blue 97, 2.0% by mass of Solvent Blue 104, and 0.8% by mass of carbon black (average primary particle diameter of 30 nm). Polyester G also contains Solvent Red 179 and Solvent Green 3.

Solvent Blue 97 and Solvent Blue 104 used for Polyester G are halogen-free anthraquinone-based blue dyes and have the following structural formulae.

Solvent Blue 97

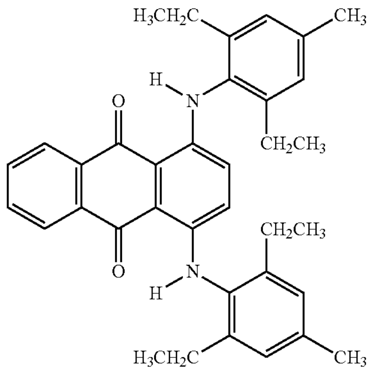

Solvent Blue 104

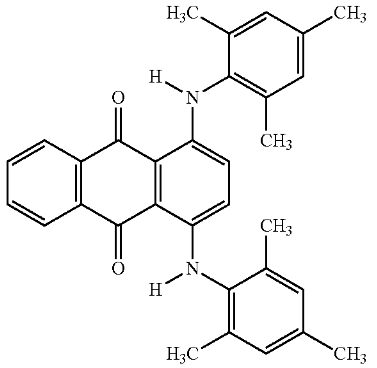

<Polyester H>

Polyester H is a high-molecular-weight ultraviolet absorber (UVA-PBT: a copolymer with polybutylene terephthalate containing 30% by mass of a UVA component manufactured by Bell Polyester Products, Inc.).

<Polyester I>

Polyester I is a polyester containing 5.0% by mass of an ultraviolet absorber (TINUVIN 1577 manufactured by Tokyo Ink Co., Ltd.) with respect to Polyester A.

Example 1

Chips of Polyester A and chips of Polyester C were blended at a mass ratio of 95:5, and the blend was charged into an extruder for an intermediate layer as a resin for the polyester layer (A).

Separately, chips of Polyester A and chips of Polyester B were blended at a mass ratio of 78:22, and the blend was charged into an extruder for a surface layer as a resin for the polyester layer (B).

Each extruder was a vented biaxial different-direction extruder, and the resin was extruded at a melt temperature of 290° C. without drying, after which the molten polymers were combined and laminated in a feed block.

Subsequently, the laminate was cooled and solidified on a cooling roll whose surface temperature was set to 40° C. by using an electrostatic application adhesion method to obtain a laminate unstretched sheet having a two-kind three-layer structure. The obtained sheet was stretched in the longitudinal direction at 85° C. and 3.5 times.

Thereafter, the film was introduced into a tenter, stretched at 105° C. and 3.7 times in the transverse direction, heat-fixed at 230° C., and further subjected to 5% relaxation treatment at 200° C. in the width direction to prepare a polyester film.

The thickness of each layer of the obtained polyester film was 2 pm for the polyester layer (B) as the surface layer and 21 μm for the polyester layer (A) as the intermediate layer, and the total thickness was 25 μm.

The properties of the obtained polyester film are shown in Table 1.

Comparative Example 1

A polyester film was prepared in the same manner as in Example 1 except that a resin obtained by blending chips of Polyester A and chips of Polyester D at a mass ratio of 96:4 was used as the resin for the intermediate layer (polyester layer (A)). The properties of this film are shown in Table 1.

Example 2

A polyester film was prepared in the same manner as in Example 1 except that chips of Polyester E were used instead of chips of Polyester C. Chips of Polyester A and chips of Polyester E were blended at a mass ratio of 94.3:5.7. The properties of this film are shown in Table 1.

Example 3

A polyester film was prepared in the same manner as in Example 1 except that chips of Polyester F were used instead of chips of Polyester C. Chips of Polyester A and chips of Polyester F were blended at a mass ratio of 94.35.7. The properties of this film are shown in Table 1.

Example 4

A polyester film was prepared in the same manner as in Example 1 except that chips of Polyester A and chips of Polyester C were blended at a mass ratio of 97.5:2.5, and the blend was charged into an extruder for an intermediate layer as a resin for the polyester layer (A). The properties of this film are shown in Table 1.

Example 6

A polyester film was prepared in the same manner as in Example 1 except that chips of Polyester A and chips of Polyester G were blended at a mass ratio of 95:5, and the blend was charged into an extruder for an intermediate layer as a resin for the polyester layer (A). The properties of this film are shown in Table 1.

Example 7

A polyester film was prepared in the same manner as in Example 1 except that chips of Polyester A, chips of Polyester E, and chips of Polyester H were blended at a mass ratio of 91.3:5.0:3.7, and the blend was charged into an extruder for an intermediate layer as a resin for the polyester layer (A). The properties of this film are shown in Table 1.

Example 8

A polyester film was prepared in the same manner as in Example 1 except that chips of Polyester A and chips of Polyester H were blended at a mass ratio of 84:16, and the blend was charged into an extruder for a surface layer as a resin for the polyester layer (B). The properties of this film are shown in Table 1.

Example 9

A polyester film was prepared in the same manner as in Example 1 except that chips of Polyester A, chips of Polyester E, and chips of Polyester I were blended at a mass ratio of 75.1:5.0:19.9, and the blend was charged into an extruder for an intermediate layer as a resin for the polyester layer (A). The properties of this film are shown in Table 1.

Example 10

A polyester film was prepared in the same manner as in Example 1 except that chips of Polyester B and chips of Polyester I were blended at a mass ratio of 22:78, and the blend was charged into an extruder for a surface layer as a resin for the polyester layer (B). The properties of this film are shown in Table 1.

TABLE 1

| | Visible light transmittance | Turbidity (Haze) | Color space | | | | | | Color difference |
|---|---|---|---|---|---|---|---|---|---|
| | | | Before metal weather test | | | After metal weather test | | | |
| | (%) | (%) | L* | a* | b* | L* | a* | b* | ΔE*ab |
| Example 1 | 41.0 | 3.2 | 70.2 | 0.3 | 1.8 | 76.1 | 2.3 | 7.9 | 8.7 |
| Example 2 | 39.2 | 3.2 | 69.0 | −1.2 | 1.6 | 76.4 | 0.8 | 12.5 | 13.3 |
| Example 3 | 40.6 | 2.7 | 70.0 | −1.2 | 1.5 | 77.8 | 0.7 | 12.8 | 13.9 |
| Example 4 | 55.0 | 3.7 | 79.0 | 0.2 | 1.6 | 82.5 | 0.7 | 13.9 | 12.8 |
| Example 5 | 15.6 | 7.8 | 46.7 | −1.8 | 1.9 | 53.4 | 0.1 | 10.9 | 11.4 |
| Example 6 | 48.6 | 3.3 | 75.1 | −0.6 | 1.5 | 83.6 | 1.4 | 19.7 | 20.2 |
| Example 7 | 42.8 | 3.0 | 71.6 | −1.4 | 0.3 | 75.1 | −0.9 | 7.5 | 8.0 |
| Example 8 | 41.1 | 4.4 | 70.4 | −1.3 | 0.6 | 75.7 | 0.2 | 6.5 | 8.1 |
| Example 9 | 42.1 | 3.5 | 71.1 | −1.3 | 0.5 | 76.5 | −0.6 | 7.1 | 8.6 |
| Example 10 | 43.0 | 2.4 | 71.7 | −1.2 | 0.5 | 75.8 | −0.4 | 6.5 | 7.3 |
| Comparative Example 1 | 45.5 | 1.6 | 73.6 | −1.4 | −2.4 | 78.0 | 2.3 | 6.0 | 10.2 |

Example 5

Two sheets of the polyester film prepared in Example 2 were laminated to form a polyester film. The properties of this film are shown in Table 1.

As is clear from the results shown in Table 1, the polyester film for window attachment of the present invention has excellent light resistance. In addition, since the polyester film for window attachment of the present invention uses a halogen-free blue dye, it has little adverse effect on the environment when discarded.

Further, in Example 1, since only 0.04% by mass of carbon black was contained in the polyester layer (A), the haze value of the polyester film was suppressed to 3.2, and the transparency of the film was secured.

On the other hand, as compared with Comparative Example 1, the color difference (light resistance) was improved in spite of the fact that carbon black was contained only in the above-described ratio, and an effect capable of enduring practical use was shown by using a halogen-free blue coloring material and a pigment in combination.

In Example 2 to Example 6, it is assumed that two or more polyester films are bonded to each other for use. The advantage of the bonding configuration is that the variety of polyester film laminates for window attachment is increased due to the ease of color adjustment.

On the other hand, in the case where a particularly high level of light resistance is required, Example 1 or Example 7 to Example 10 can be applied.

The invention claimed is:

1. A polyester film, comprising:

a polyester layer (A) containing a halogen-free blue dye and a pigment; and a polyester layer (B) on one surface of the polyester layer (A), wherein the halogen-free blue dye and the pigment are melted and blended with each other prior to formation of the polyester layer (A), wherein the pigment is present in the polyester layer (A) in an amount of 0.02 to 0.1% by mass based on a total mass of the polyester layer (A), and wherein the halogen-free blue dye and the pigment are prepared in a master batch by melting and mixing a first polyester, the halogen-free blue dye, and the pigment to form the master batch including the pigment in an amount of greater than 0.1% by mass based on a total mass of the master batch, and wherein the polyester layer (A) is formed by blending the master batch with a second polyester free of the halogen-free blue dye and the pigment to form a mixture, the mixture including the pigment in an amount of 0.02 to 0.1% by mass based on a total mass of the mixture, and extruding the mixture.

2. The polyester film according to claim 1, wherein the halogen-free blue dye is a halogen-free anthraquinone-based blue dye.

3. The polyester film according to claim 2, wherein the halogen-free anthraquinone-based blue dye is a compound represented by the following general formula (I):

(I)

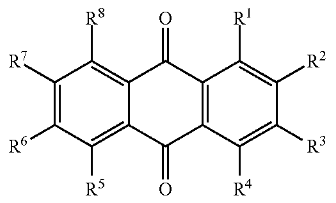

wherein $R^1$ and $R^4$ each independently represent a substituted or unsubstituted amino group, $R^2$, $R^3$, and $R^5$ to $R^8$ each independently represent a hydrogen atom or a substituent, and $R^2$ and $R^3$ may be bonded to each other to form a ring.

4. The polyester film according to claim 3, wherein the halogen-free anthraquinone-based blue dye is a compound represented by the following general formula (III-a) or a compound represented by the following general formula (IV):

(III-a)

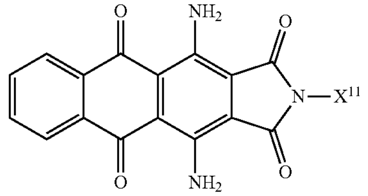

wherein $X^{11}$ represents a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group;

(IV)

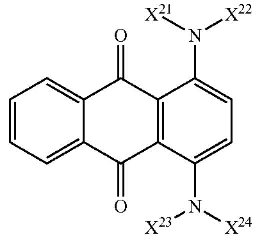

wherein $X^{21}$ to $X^{24}$ each independently represent a hydrogen atom, a substituted or unsubstituted alkyl group, a substituted or unsubstituted cycloalkyl group, a substituted or unsubstituted alkoxy group, a phenyl group, a substituted or unsubstituted aryl group, or a substituted or unsubstituted aralkyl group.

5. The polyester film according to claim 1, wherein a ratio of a thickness of the polyester layer (B) to a thickness of the polyester layer (A), [(B)/(A)], is 0.05 to 0.5.

6. The polyester film according to claim 1, wherein the pigment is carbon black.

7. The polyester film according to claim 1, wherein the pigment is silica and/or alumina.

8. A polyester film laminate, comprising:

the polyester film according to claim 1; and a hard coat layer provided on a surface of the polyester film.

9. A polyester film laminate, comprising:

the polyester film according to claim 1; and a pressure-sensitive adhesive layer provided on a surface of the polyester film.

10. The polyester film laminate according to claim 8, further comprising a pressure-sensitive adhesive layer on a surface of the polyester film opposite to the hard coat layer.

11. The polyester film laminate according to claim 9, further comprising a release film provided on a surface of the pressure-sensitive adhesive layer.

12. The polyester film according to claim 1, wherein the polyester film consists of two layers.

13. The polyester film according to claim 1, wherein the pigment is present in the polyester layer (A) in an amount of 0.03 to 0.1% by mass based on a total mass of the polyester layer (A).

14. The polyester film according to claim 13, wherein the pigment is carbon black.

15. The polyester film according to claim 1, wherein the pigment is present in the polyester layer (A) in an amount of 0.04 to 0.1% by mass based on a total mass of the polyester layer (A).

16. The polyester film according to claim 15, wherein the pigment is carbon black.

* * * * *